United States Patent [19]

Fagan et al.

[11] Patent Number: 4,876,934

[45] Date of Patent: Oct. 31, 1989

[54] COMPUTERIZED BREAD SPLITTER

[75] Inventors: John E. Fagan; A. Farrel Droke, both of Norman, Okla.

[73] Assignee: Burford Corp., Maysville, Okla.

[21] Appl. No.: 93,816

[22] Filed: Sep. 8, 1987

[51] Int. Cl.⁴ .............................................. B26D 3/08
[52] U.S. Cl. ........................................ 83/879; 83/53;
    83/76.1; 83/177; 83/861; 425/142; 364/468
[58] Field of Search ...................... 425/90, 92, 97, 99,
    425/142; 99/516, 536; 83/71, 53, 177, 879, 861;
    427/424; 118/674, 681, 315; 364/468

[56]         References Cited
         U.S. PATENT DOCUMENTS 3,978,748  9/1976  Leslie et al. .............................. 83/53
4,246,838  1/1981  Pulver et al. .......................... 99/516
4,534,002  8/1985  Urban ...................................... 83/71

OTHER PUBLICATIONS

Water Splitter/Butter Applicator-1983, Burford Corp.

Primary Examiner—Bernard Nozick
Attorney, Agent, or Firm—Crutsinger & Booth

[57]              ABSTRACT

A hydraulic splitter for cutting proofed dough pieces carried on a conveyor to form a chevron shaped pattern on the dough pieces. A manifold having multiple nozzles is movable along a guide rail by a timing belt driven by a stepping motor. The stepping motor is controlled by a computerized system in conjunction with a pan velocity sensor and a pan position sensor for initiating a cycle of operation and controlling movement of the manifold transversely of the conveyor. One of a plurality of stored programs is selected for controlling the shape of the pattern formed on the dough piece.

8 Claims, 12 Drawing Sheets

COMPUTERIZED BREAD SPLITTER

TECHNICAL FIELD

A splitter for proofed dough products controlled by a computerized system for adjusting a design formed on a dough product.

BACKGROUND OF INVENTION

Water splitters and butter applicators heretofore employed by commercial bakers have employed stationary nozzles dispensing a high velocity water stream to impinge against dough products for forming a split-top on the bread products. Similar systems have been employed for dispensing butter, cinnamon, honey, sugar and other flavored or colored liquids.

Water splitters commercially available for bakery lines are commercially available from Burford Corp. of Maysville, Okla. Typical splitters have incorporated a plurality of stationary nozzles mounted on a support bar extending transversely of and above a conveyor which carried dough in bread pans adjacent the nozzles. Streams of liquid formed straight slits in the top surfaces of dough as the dough was moved along a straight path below the nozzles. A proximity switch initiated liquid flow when the leading edge of a pan reached a specified position.

Heretofore, devices for forming a pattern other than a straight slit extending in a direction longitudinally of the path of conveyor movement have not been commercially successful. Difficulty has been encountered in properly locating the starting and end points of a slit formed by a nozzle carried by an air cylinder and moved transversely of a conveyor in an attempt to form one or more slits extending diagonally across the top surface of a loaf of bread.

A need exists for a splitter capable of forming designs on bakery products, for example, to form a logo, numerals, letters or other indicia on the surface of the product.

SUMMARY OF INVENTION

The hydraulic splitter disclosed herein is particularly adapted for cutting a proofed dough product carried on a conveyor and generally comprises a source of pressurized liquid, a motorized cutter head carrying a plurality of nozzles,, and a computerized control system which establishes and maintains a predetermined movement of the nozzles relative to a conveyor carrying a dough product. The cutter head comprises a manifold having a plurality of nozzles mounted thereon supported by a carriage movable along a guide which extends above and transversely of a conveyor. The carriage is secured to a timing belt driven by a stepper motor which is controlled by a computerized system to initiate and terminate movement of the carriage, to initiate and terminate flow of fluid through the nozzles. The computerized system incorporates a memory storage device in which programs are pre-programmed to form a predetermined pattern corresponding to equations of the first, second or third order. For example, nozzles may be moved transversely of the conveyor to form a straight line slit in the surface extending parallel to the direction of movement of the conveyor, perpendicular to the direction of movement of the conveyor or at any angle in between. A saw-tooth pattern or a sine wave may be formed on the surface of the dough product by merely selecting an appropriate program from the memory storage device.

A pan speed sensor and a pan position sensor are mounted relative to the conveyor for supplying data to the computer indicating the speed of a pan on the conveyor such that when the pan position indicator delivers a signal to the computer indicating the position of the pan relative to the nozzles a cycle of operation is initiated. The computerized control system is adapted to adjust movement of the nozzles in response to a change in speed of pans carried by a conveyor. Thus, in the event that the conveyor speed is increased, the sensors deliver signals to cause the computerized control system to increase the speed of movement of the nozzles and to adjust the time at which flow of liquid through the nozzles is initiated and terminated.

DESCRIPTION OF DRAWING

Drawings of a preferred embodiment of the invention are annexed hereto so that the invention may be better and more fully understood, in which.

Numeral references are employed to designate like parts throughout the various figures of the drawing.

DESCRIPTION OF A PREFERRED EMBODIMENT

Figure 1:
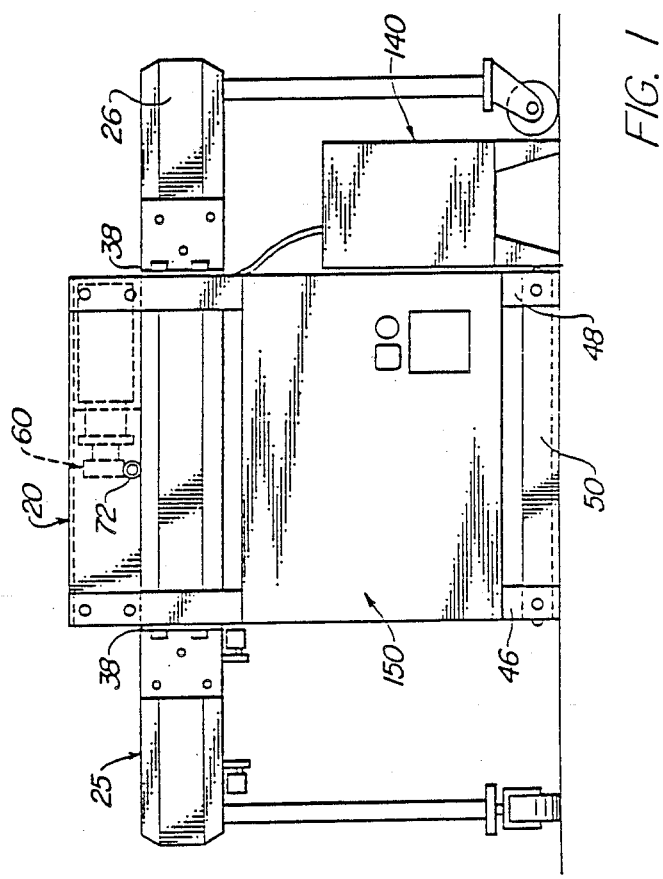
FIG. 1 is a side elevational view of a computerized splitter for dough products associated with a conveyor.
Figure 2:
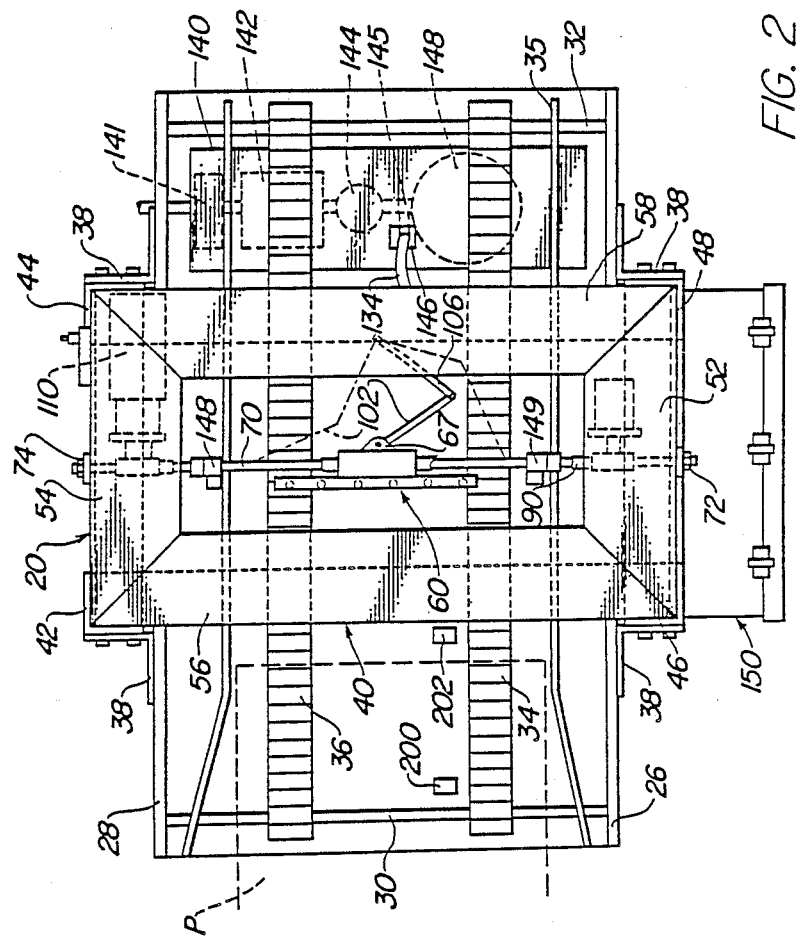
FIG. 2 is a top plan view thereof.

Referring to FIGS. 1 and 2 of the drawing, the numeral 20 generally designates a computerized bread splitter comprising a cutter mechanism 60; a water pressure system 140; and a computerized control panel 150 controlling movement of the cutter mechanism 60.

Conveyor 25 is of conventional design and comprises spaced side frames 26 and 28 having shafts 30 and 32 extending therebetween carrying pulleys upon which conveyor belts 34 and 36 are mounted. Guide rails 35 are supported from side frames 26 and 28 and are arranged to position pans carried by the conveyor. Conveyor 25 is of conventional design and forms no part of the invention disclosed herein except in combination with the slitter structure. A typical conveyor would carry pans having a width of for example 20 inches at a speed of for example 100 feet per minute through one or more stations in a bakery.

The frame assembly 40 of slitter mechanism 20 comprises vertically extending corner posts 42, 44, 46 and 48 extending upwardly from a generally rectangular shaped base 50. Base 50 and the corner posts are preferably constructed of angle members, as best illustrated in FIG. 2, of the drawing and channel members 52, 54, 56 and 58 are secured to the upper ends of the corner posts to form a support structure for a reciprocating cutter head 60. Brackets 38 are bolted or otherwise secured between conveyor sideframes 26 and 28 and frame assembly 40 to provide a stiff structural attachment between splitter 20 and conveyor 25 to support inertial loading resulting from reciprocating movement of the cutter head 60.

Figure 3:
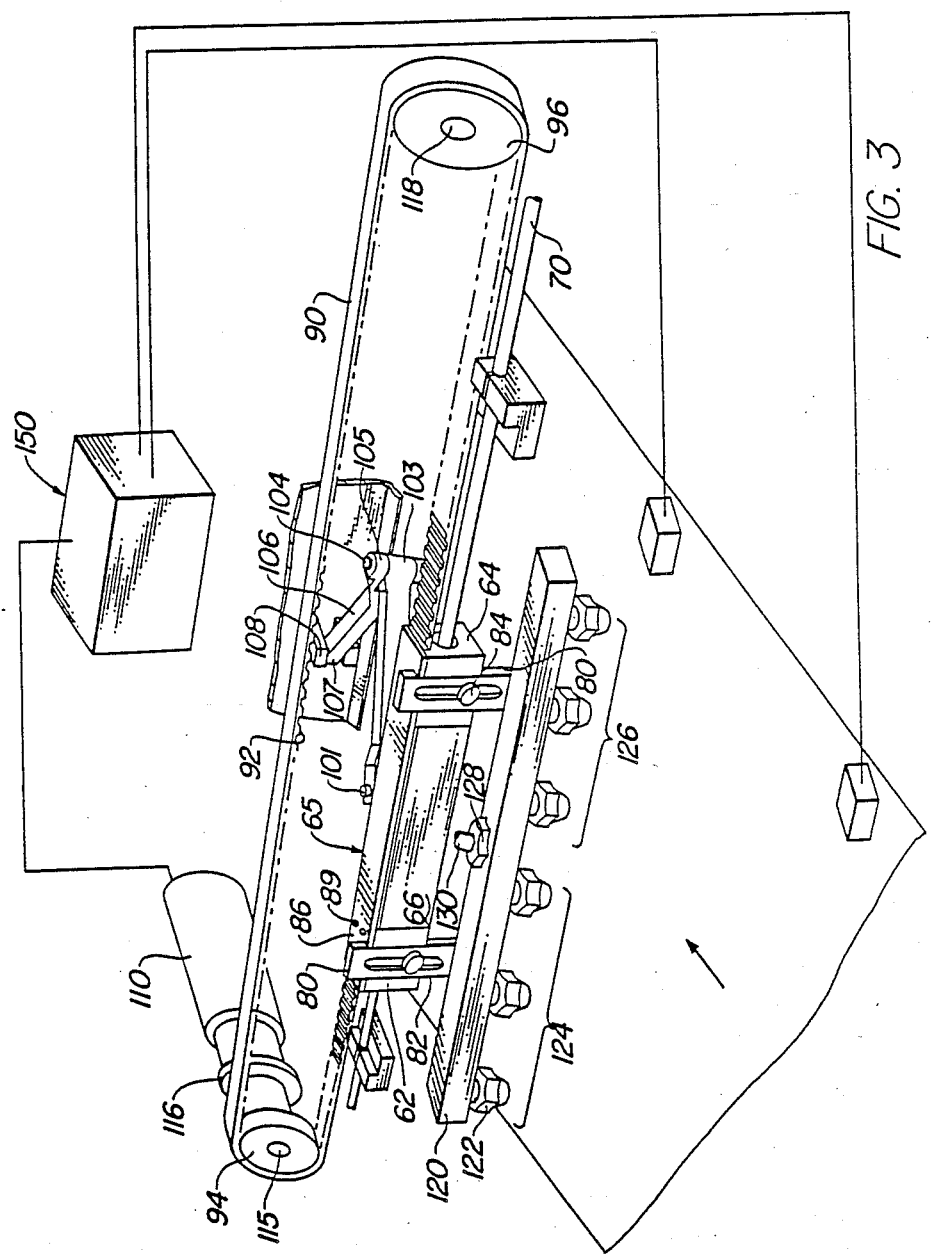
FIG. 3 is a fragmentary front perspective view.

As diagrammatically illustrated in FIG. 3 of the drawing, cutter head 60 comprises a slider block 65 movably mounted on guide bar 70 having opposite ends supported in bearing sleeves 72 and 74 secured to channel members 52 and 54 adjacent opposite sides of frame assembly 40 of slitter mechanism 20. In the illustrated embodiment of the invention guide bar 70 is a round $\frac{5}{8}''$ stainless steel rod. Slider block 65 is formed by spaced bearing blocks 62 and 64 secured to opposite ends of a hollow tubular body member 66. Bearing blocks 62 and 64 are provided with linear bearings 63 which are movably supported on guide bar 70.

Figure 6:
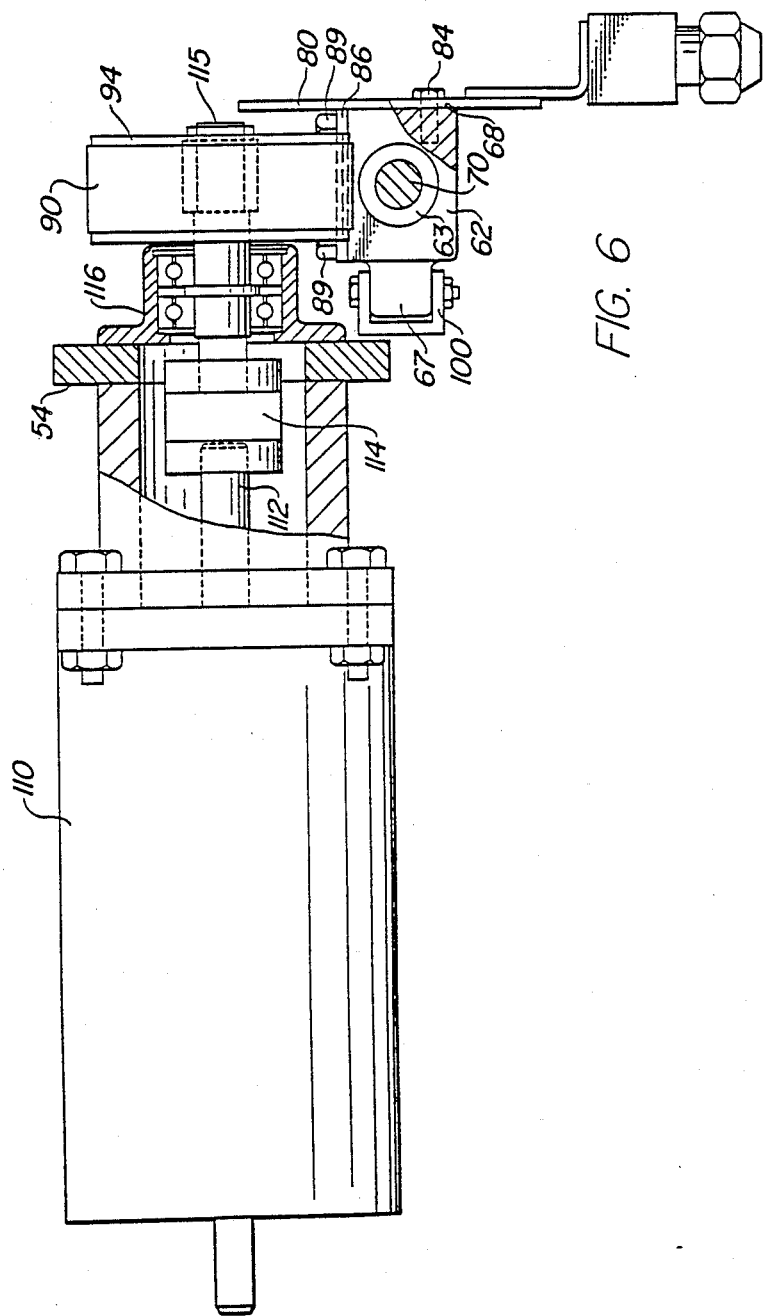
FIG. 6 is an enlarged cross sectional view taken along line 6—6 of FIG. 5.

Grooves 68 are formed in front faces of each of the bearing blocks 62 and 64, as illustrated in FIGS. 3 and 6 of the drawing. Brackets 80 having slots 82 are slidably disposed in grooves 68 and are secured to bearing blocks 62 and 64 by set screws 84.

Upper surfaces of bearing blocks 62 and 64 have grooves formed therein through which a timing belt 90 having teeth 92 formed thereon extends. A cover plate 86 having rack gear teeth 88 formed on the lower surface thereof is positioned such that rack gear teeth 88 engage teeth 92 on timing belt 90. Cover plate 86 is secured by set screws 89 to bearing blocks 62 and 64. As will be hereinafter more fully explained, slider block assembly 65 is reciprocated by timing belt 90 longitudinally of guide bar 70 which extends transversely of the conveyor.

The central portion of body member 66 of slider block assembly 65 has a lug 67 formed thereon to which end 100 of stabilizer link 102 is secured by a pivot pin 101. End 103 of stabilizer link 102 is pivotally secured by a pivot pin 104 to end 105 of a second stabilizer link 106. End 107 of stabilizer link 106 is secured by pivot pin 108 to channel member 58 on frame assembly 40. Stabilizer links 102 and 106 prevent rotation of slider block assembly 65 about the axis of guide bar 70.

Referring to FIGS. 2, 3 and 6 of the drawing, a stepper motor 110 has a drive shaft 112 drivingly secured to a flexible coupling 114 on the end of driven shaft 115 which extends through and is rotatably secured in a bearing block 116 bolted or otherwise secured to member 54 of frame assembly 40. A timing belt pulley 94 is mounted on driven shaft 115. A second timing belt pulley 96 is secured to a stub shaft 118 rotatably mounted in a bearing block 117 secured by a bracket 119 to member 52 of frame assembly 40.

Figure 4:
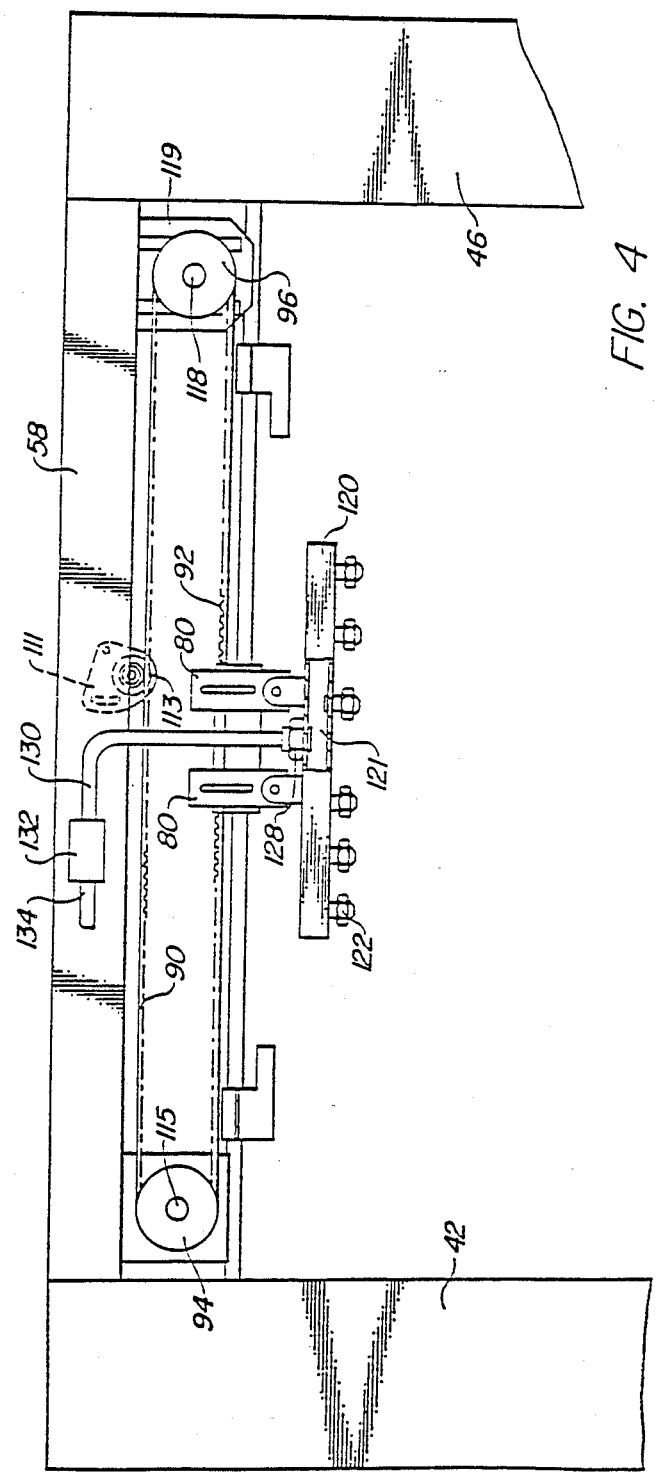
FIG. 4 is a diagrammatic front elevational view.
Figure 5:
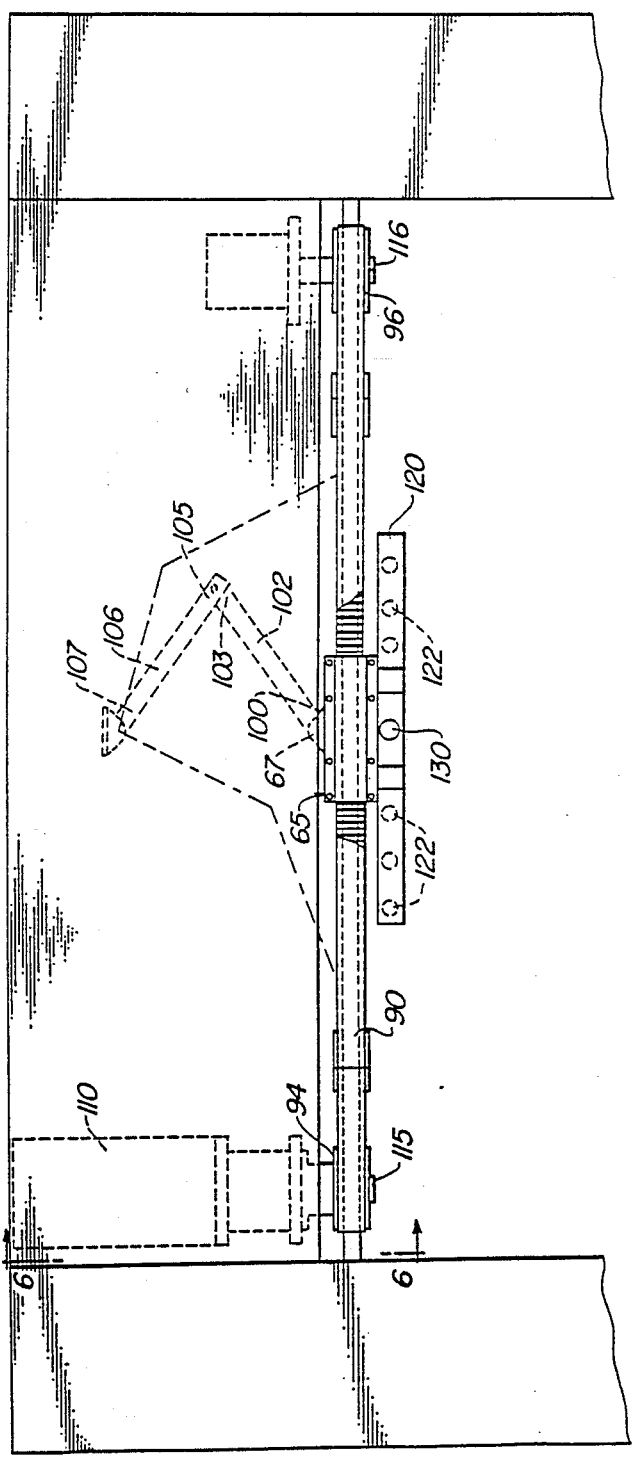
FIG. 5 is a diagrammatic top plan view.

As best illustrated in FIG. 4 of the drawing, an idler pulley 113 is rotatably supported on a shaft secured to an adjustable tensioning arm 111 pivotally secured to frame member 58 for adjusting tension in timing belt 90.

As illustrated in FIGS. 3, 4 and 6, a manifold 120 has nozzles 122 threadedly secured thereto forming first and second banks 124 and 126, respectively, of nozzles. Manifold 120 comprises a hollow tubular member having an interior compartment 121. Water or other fluid is delivered into compartment 121 through a fitting 128 secured to the end of supply line 130. A solenoid actuated valve 132 is connected between supply line 130 and a feed line 134 to a suitable source of pressurized fluid 140. The source of pressurized fluid preferably includes a pump which delivers pressurized fluid to an accumulator or other suitable reservoir from which fluid is supplied through nozzles 122 when valve 132 is opened.

Fluid supply 140 preferably includes a small micron filter 141 in line with a back-up filter 142 for removing contaminates from water or other suitable fluid. The back-up filter is connected to a rotary vane-type pump 144 having an integral relief valve. The outlet of the pump is connected through a T-fitting 145 and pressure regulator 146 to feedline 134 and to a pressure accumulator.

Fluid pressure in feedline 134 is generally in a range between 40 and 60 psi. The outlet pressure from pump 144 is adjustable for controlling a cut in the proofed dough product by water jets formed by nozzles 122. High fiber dough products require slightly more pressure for forming a cut than is required for low fiber products.

Nozzles 122 preferably have an opening which is for example, 0.0016 inch in diameter through which water is directed at a velocity to enter the dough piece a distance between 1/16 and $\frac{1}{8}$ of an inch such that the cooked dough appears to have been cut by a knife or twisted. The depth of the cut in the piece of dough influences the "scarring" of the cooked product.

Each nozzle 122 is provided with a check valve having a predetermined opening pressure of, for example, 5 psi for maintaining manifold 120 and supply line 130 filled with fluid to prevent cavitation. The check valves also prevent dripping of fluid from nozzles 122 when solenoid actuated valve 132 is closed.

Manifold 120 is adjustable vertically relative to slider block assembly 65 for adjusting the distance between the end of the nozzles 122 and the upper surface of the dough product.

Stepper motor 110 and solenoid actuated valve 132 are controlled by a computer for moving slider block 65 carrying manifold 120 transversely relative to conveyor 34, 36 and to control flow through nozzles 122. Limit switches 148 and 149 are adjustably secured on guide bar 70 for limiting the travel of slider block assembly 65, as will be hereinafter more fully explained.

Figure 10:
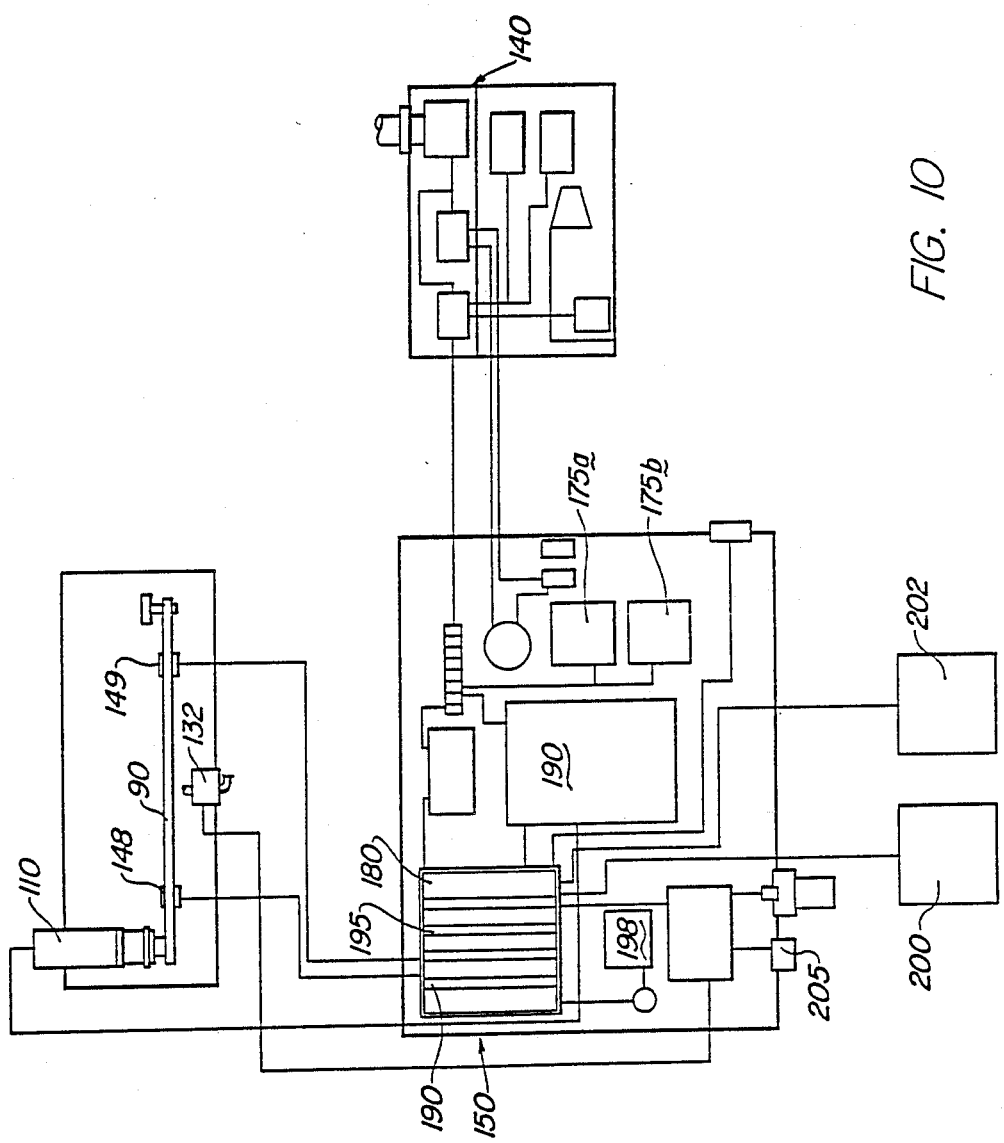
FIG. 10 is a diagrammatic view of the power and control system.
Figure 11:
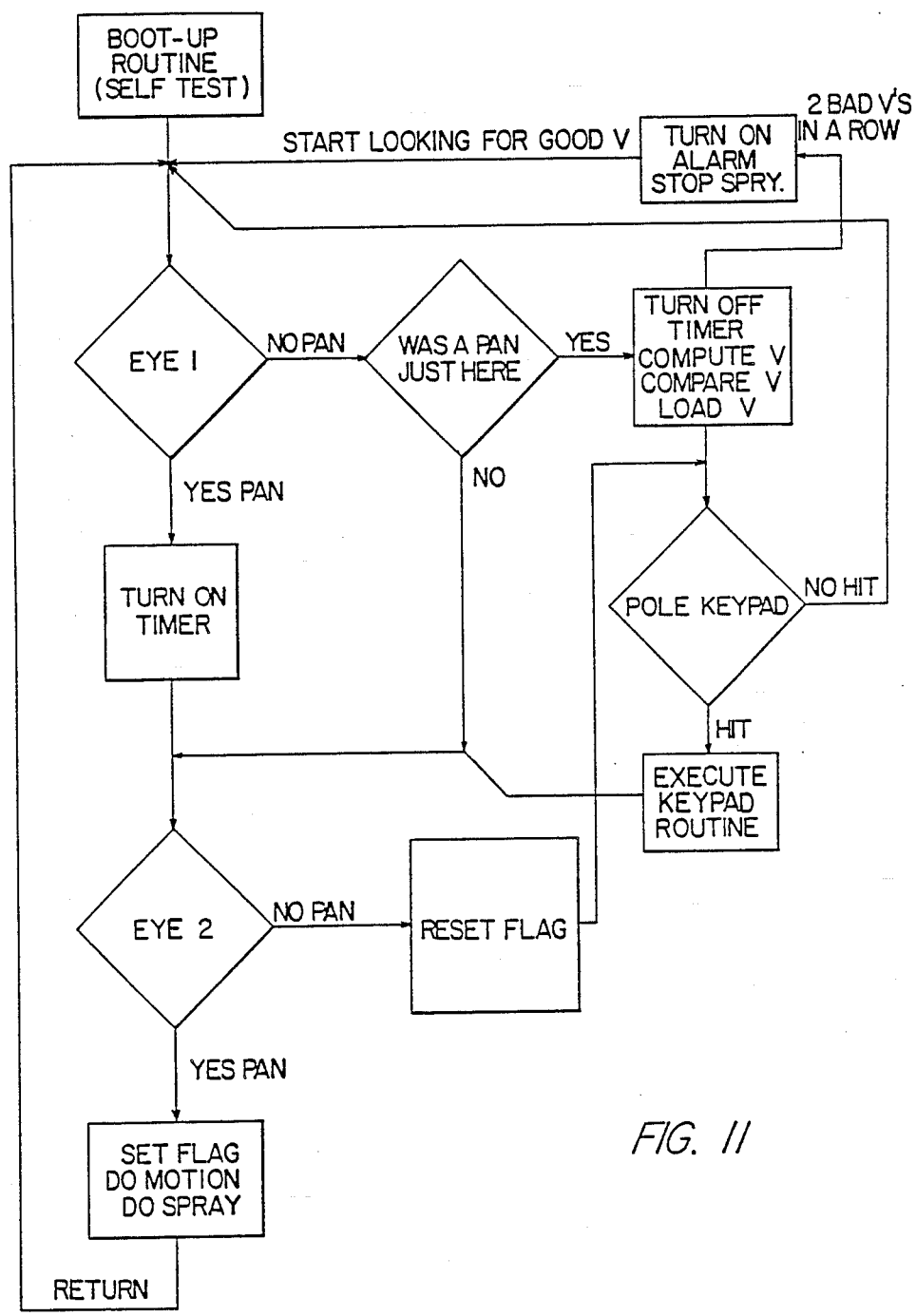
FIG. 11 is a logic flow diagram.

A diagrammatic view of computer 150 for controlling the system is illustrated in FIG. 10 of the drawing. A logic flow diagram is illustrated in FIG. 11.

Computer 150 diagrammatically illustrated in FIG. 10 of the drawing is an IBM brand personal computer model PC equipped with an 8088 microprocessor and a disc drive which functions as a memory device.

Figure 7:
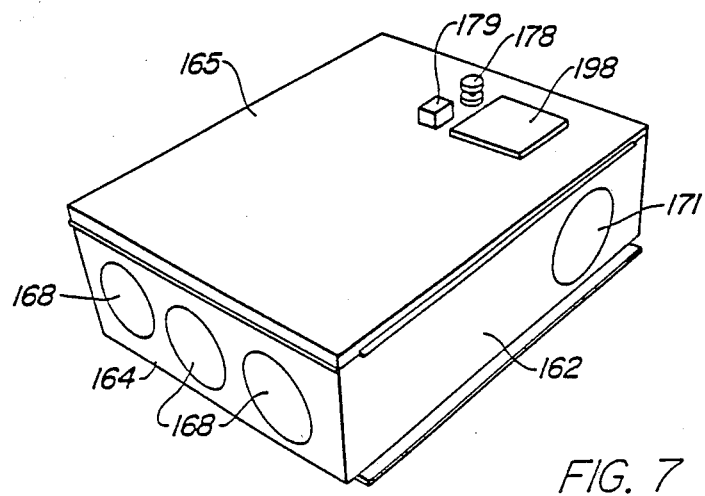
FIG. 7 is a top perspective view of a control panel.
Figure 8:
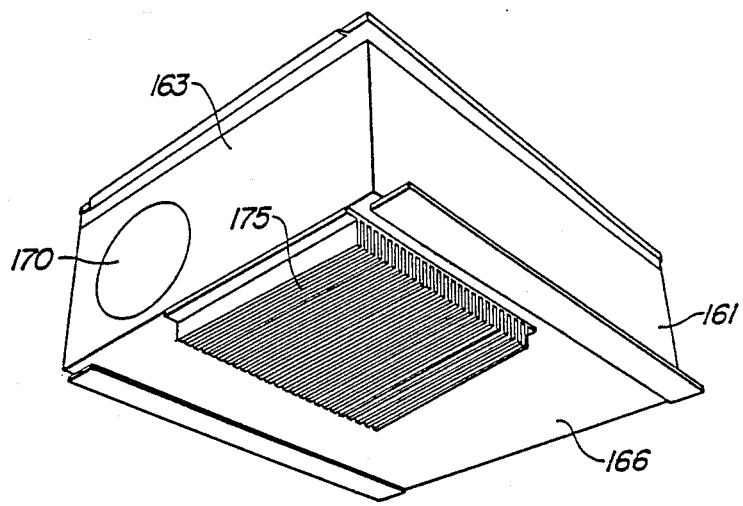
FIG. 8 is a bottom perspective view of the control panel.

The computer 150 is mounted in a control cabinet 160 which, as illustrated in FIGS. 7 and 8 of the drawing, comprises sidewalls 161 and 162, end walls 163 and 164, a front wall 165 and a back wall 166. Inlet openings 168 are formed in end wall 164 while outlet openings 170 and 171 are formed in side wall 162 and end wall 163, respectively. Air filters are mounted in intake openings 168 and cooling fans 175a and 175b are mounted for forcing air through outlet openings 170 and 172. A key pad 198, on-off power switch 178 and a LCD display 179 are mounted on the front wall 165.

Figure 9:
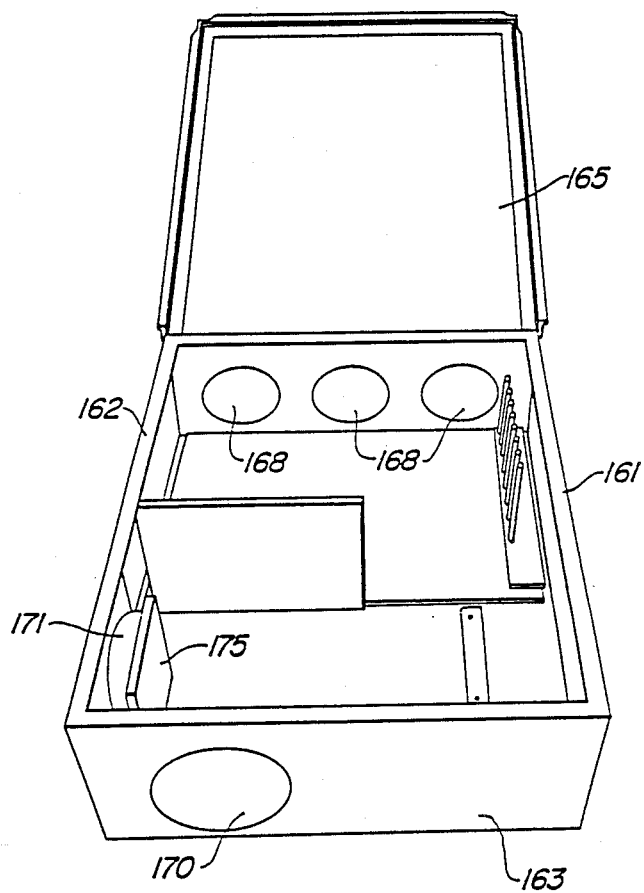
FIG. 9 is a perspective view of the inside of the control panel, computer boards being removed therefrom to more clearly illustrate details of construction.

It is important that control cabinet 160 be of strong rigid construction and provided with sufficient cooling and air filtration capabilities to protect delicate components of the computer mounted in the cabinet. The interior of the cabinet is illustrated in FIG. 9 of the drawing, the circuit boards and power supply being removed to more clearly illustrate details of construction. However, as illustrated in FIG. 9, filtered cooling air is drawn through inlet openings 168 by cooling fans mounted adjacent outlet openings 170 and 171. The power supply for the computer is preferably mounted adjacent outlet openings 170 and 171 for dissipating heat from the power supply directly through outlet openings 170 and 171.

Figure 12:
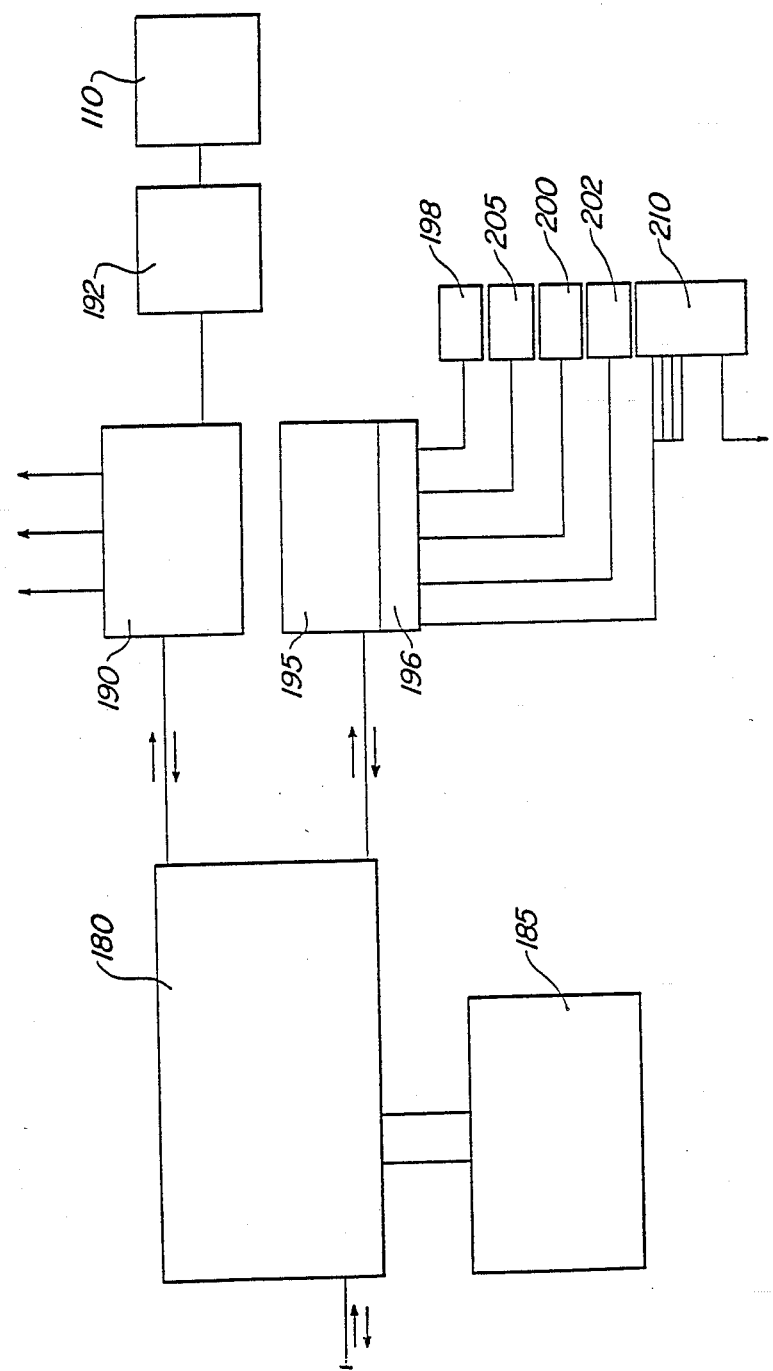
FIG. 12 is a block diagram diagrammatically illustrating the computerized control system.

As illustrated in FIG. 12, central processing unit 180 is connected to a conventional disc drive 185 and to input-output boards 190 and 195. Input-output device 190 is used for indexing the drive 192 for stepper motor 110.

Input-output device 195 is connected through a buffer 196 to a keyboard 198, a pair of pan sensors 200 and 202, an alarm circuit 205 and to a spray circuit input device 210.

Figure 13:
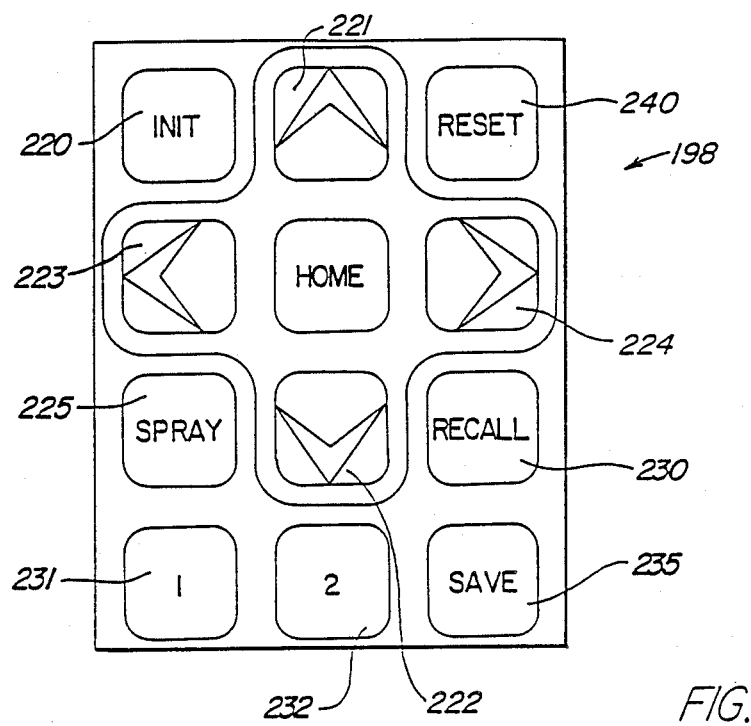
FIG. 13 is an elevational view of a keyboard used by an operator for programming the computerized control system.

Keyboard 198 is illustrated in FIG. 13 of the drawing. The keyboard is simplified to permit operation of the device without requiring knowledge of a computer system. After the system has been turned on through power switch 178, touching key 220 marked "init" boots the start-up program and initiates a diagnostic program which tests the computer circuits and circuits of auxiliary devices associated therewith.

Touching key "recall" key 230 prepares the computer to load a specified program. Keys 231 and 232 specify which program stored on a disc will be loaded into the computer.

Touching key 225 marked "spray" activates stepper motor 110 to initiate a cycle of operation and causes the computer to energize solenoid valve 132 so that the operator may observe the line impacted by a stream from nozzle 122. If the point of impact is not properly located, touching keys 221–224 will move the impact point from the preset position to an adjusted position.

Touching "save" key 235 will save the modified program to disc. Touching "reset" key 240 clears the computer memory so that a different program can be loaded.

Pan velocity sensor 200 and pan position sensor 202 are beam type sensors, for example Efector 8033 proximity sensors which generate signals to indicate the presence of a pan P. The output from sensor 200, when the length of pan P is known, allows the computer to calculate the speed of the pan. The output from sensor 202 is used by the computer to initiate a cycle of operation.

Figure 14:
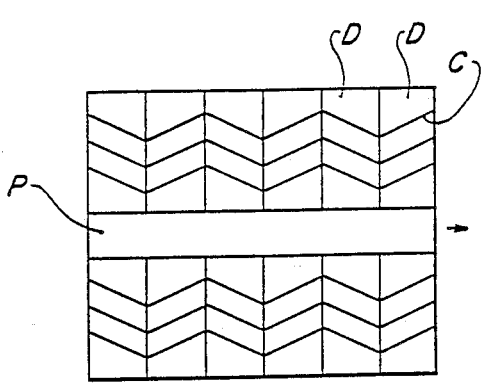
FIG. 14 is a diagrammatic view of a bread pan moving a plurality of loaves of bread upon which a Chevron pattern is formed.
Figure 15:
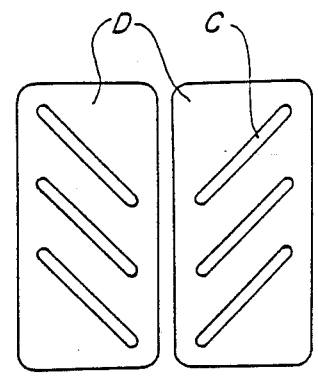
FIG. 15 is an enlarged diagrammatic view of two loaves of bread having a Chevron pattern formed thereon.

It should be readily apparent the cuts C forming patterns as illustrated in FIGS. 14 and 15 will be formed on dough D by a selected computer program. The system is programable to trace between the leading edge and the trailing edge of a pan any third order mathematical function where the order of the function is determined by the reciprocal of the speed.

Having described our invention, we claim:

1. A hydraulic splitter for cutting a product carried on a conveyor comprising: support means adjacent the conveyor; guide means on said support means, said guide means extending transversely of the conveyor; a source of pressurized fluid; a nozzle; means operably connecting said source of pressurized fluid to said nozzle; a carriage; means movably securing said carriage to said guide means; means securing said nozzle to said carriage; a motor; a flexible belt; means drivingly connecting said motor to said belt; means securing said belt to said carriage for moving said carriage longitudinally of said guide means and transversely of the conveyor; and control means associated with said motor to move said nozzle transversely of the conveyor such that fluid dispensed from said nozzle impinges a product moved by the conveyor to form a chevron shaped pattern on the product.

2. Apparatus to split proofed dough pieces carried on a conveyor to form a chevron pattern comprising: a dispenser head; a fluid dispenser on said dispenser head; means to move said dispenser head across the conveyor; means sensing the speed of a dough piece carried on the conveyor; means sensing the position of the dough piece; and control means associated with said sensor means adapted to position said dispenser head in a predetermined relationship to said dough piece, energize said dispenser, and move said dispenser at a predetermined speed transversely of the conveyor to form the pattern on the dough piece.

3. Apparatus to split proofed dough according to claim 2, said means to move said dispenser head across the conveyor comprising: a motor; a flexible belt; means drivingly connecting said motor to said belt; and means securing said belt to said dispenser head.

4. Apparatus to split proofed dough according to claim 2, said control means comprising: a central processing unit; a PC 21 stiffer indexer; a display adapter; an input output board; and a memory storage control card.

5. Apparatus according to claim 4, said means sensing the speed of the dough piece on the conveyor and said means sensing the position of the dough piece being connected through said input output board to said central processing unit.

6. Apparatus according to claim 5, with addition of a key pad connected to said input output board.

7. Apparatus according to claim 6, said control means being mounted in a control panel comprising spaced sidewalls, spaced end walls and a back wall; an access door hingedly secured to one of said side walls; said key pad being mounted on said access door.

8. Apparatus according to claim 7, said key pad comprising a plurality of keys including a home key and four direction keys arranged around said home key for adjusting a program stored in said central processing unit for adjusting the initiation, termination and speed of movement of said dispenser head relative to said conveyor.

* * * * *